United States Patent [19]

Baker

[11] Patent Number: 5,199,462
[45] Date of Patent: Apr. 6, 1993

[54] VALVE HAVING ROCKER VALVE MEMBER AND ISOLATION DIAPHRAGM

[75] Inventor: Joseph W. Baker, Sommerville, N.J.

[73] Assignee: Automatic Switch Company, Florham Park, N.J.

[21] Appl. No.: 854,880

[22] Filed: Mar. 18, 1992

[51] Int. Cl.$^5$ .................... F16K 7/16; F16K 11/052
[52] U.S. Cl. ................. 137/625.44; 137/875; 251/129
[58] Field of Search ............. 137/625.44, 636, 863, 137/867, 870, 875, 883; 251/129.17, 129.2, 331, 335.2, 228, 298, 229, 303

[56] References Cited

U.S. PATENT DOCUMENTS 4,986,308  1/1991  Champseaux .......... 137/625.44
5,027,857  7/1991  Champseaux .......... 251/129.2

Primary Examiner—George L. Walton
Attorney, Agent, or Firm—Fiddler Levine & Mandelbaum

[57] ABSTRACT

A valve having a valve body formed with a chamber with which a plurality of ports in the valve body communicate. At least one of the ports is adapted for connection to a source of pressurized fluid. A rocker valve member is pivotally mounted within the chamber and swings between two extreme positions in which it closes and opens at least one of the ports. A diaphragm within the chamber extends from the periphery of the rocker valve member and the margin of the diaphragm is secured in the valve body. All the ports in the valve body face one side of the diaphragm. An operator, for swinging the rocker valve member between its extreme positions, engages the rocker valve member on the side of the diaphragm opposite the side facing the ports, so that the diaphragm serves to isolate the ports from the operator. The chamber is defined in part by a wall facing the side of the diaphragm opposite the side of the diaphragm facing the ports, the wall being spaced far enough from the diaphragm so that when the portion of the chamber between the diaphragm and the port is pressurized, causing the diaphragm to swell in the direction of the wall, the wall is not engaged by the diaphragm.

6 Claims, 2 Drawing Sheets

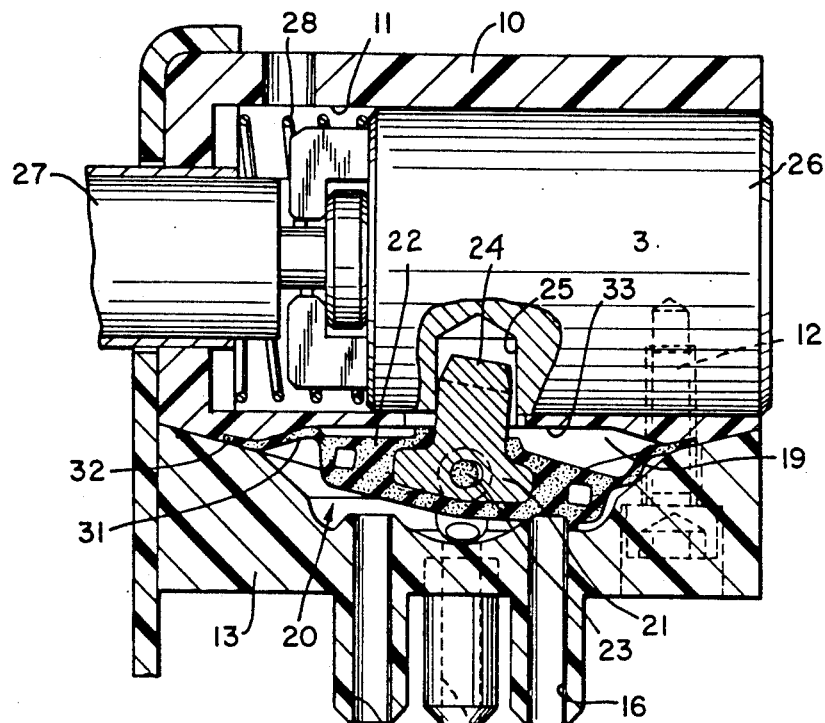
FIG. 1
PRIOR ART
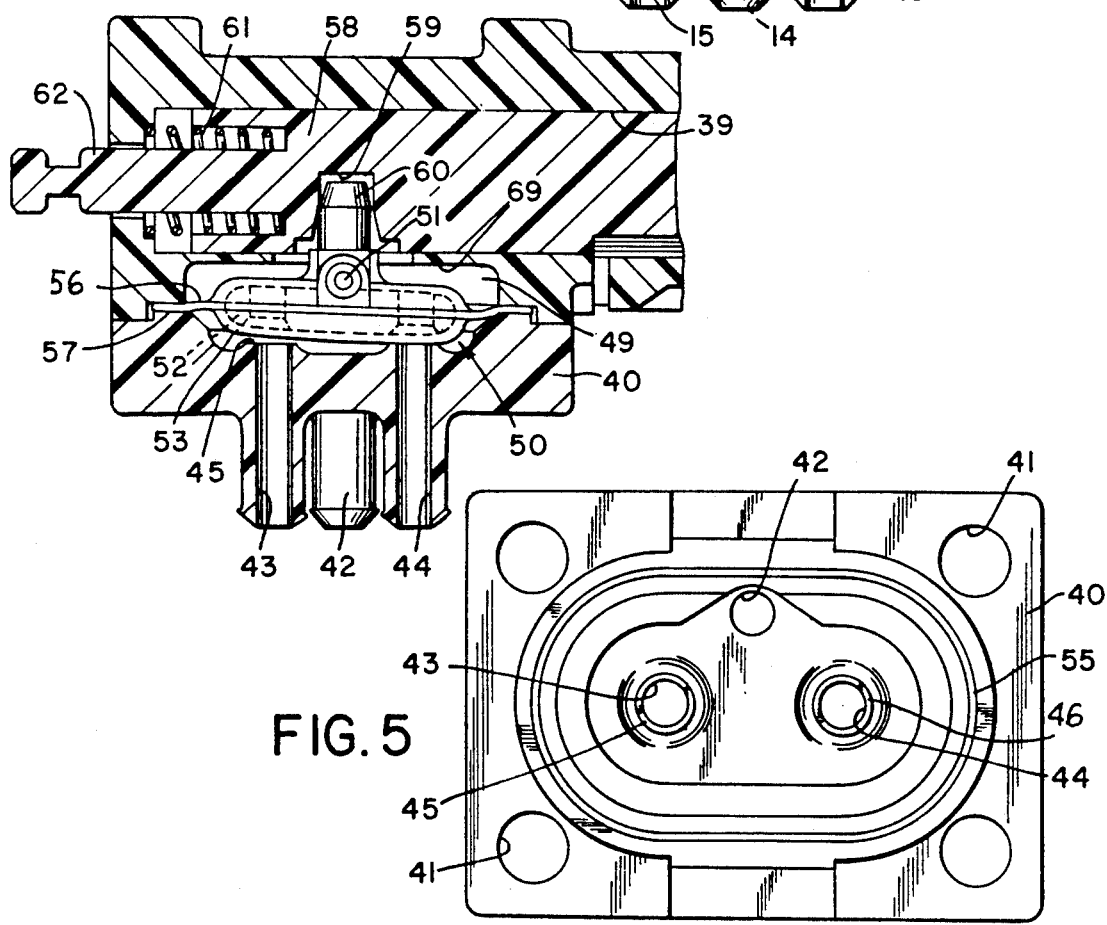
FIG. 4
FIG. 5

VALVE HAVING ROCKER VALVE MEMBER AND ISOLATION DIAPHRAGM

This invention relates to valves, and more particularly to a valve of the type having a rocker valve member and a diaphragm which isolates the fluid ports of the valve from the valve operator.

A valve of this type is shown and described in U.S. Pat. No. 5,027,857. The valve illustrated in that patent is of the three-way type, including a fluid inlet port and two outlet ports. The valve member rocks between two extreme positions in which it closes one or the other of the outlet ports, the inlet port being constantly open. The valve member is located within a chamber formed in the valve body, the valve ports opening into the chamber.

A valve operator, which may be electrically controlled, rocks the valve member between its two extreme positions. A flexible diaphragm, within the chamber, surrounds the valve member and extends radially outwardly from it, the radially outward margin of the diaphragm being gripped by the valve body. The diaphragm serves to isolate the valve operator from the valve ports, so that the operator is never contacted by the fluid being handled by the valve.

The valve of U.S. Pat. No. 5,027,857 has been found to present certain problems when in service. The valve has a tendency to leak at fluid pressures which it is intended to handle. Specifically, fluid tends to leak from the valve chamber which accommodates the valve member, out of the outlet port which is closed by the valve member. An attempt has been made to overcome this problem by increasing the force which the valve operator applies to the rocker valve member. However, this solution has a deleterious effect on the life of the valve, since the valve member is then pressed with greater force against the valve seats surrounding the outlet ports.

The reason why the valve leaks is not readily apparent or intuitively obvious. However, the inventor of the present improved valve has discovered the cause of the problem. When the valve is pressurized with fluid under pressure, the diaphragm swells or bulges in the direction away from the valve ports. Since the valve is tilted in each of its extreme positions, the portion of the diaphragm closer to the open outlet port is also closer to the wall of the valve chamber opposite the wall containing the valve ports. As a result, the swollen region of the diaphragm closer to the open outlet port engages the wall of the valve chamber opposite the wall containing the ports. This engagement of the diaphragm and valve chamber wall results in an imbalance of forces on the rocker valve member and diaphragm, and this imbalance has a tendency to lift the valve member away from the port which is closed, permitting leakage through that port.

It is, therefore, an object of the present invention to provide a valve having a rocker valve member and an isolation diaphragm, of the type shown in U.S. Pat. No. 5,027,857, wherein the valve member and diaphragm remain balanced regardless of the operating pressure being handled, and hence has no tendency to leak as operating pressure is increased.

It is another object of the present invention to provide such a valve having a longer useful life than the prior art valve.

It is a further object of the invention to provide such a valve which requires smaller operator forces applied to the valve member in order to successfully operate the valve.

Additional objects and features of the invention will be apparent from the following description, in which reference is made to the accompanying drawings.

In the drawings:

FIG. 1 is a longitudinal cross-sectional view through the valve illustrated in prior art U.S. Pat. No. 5,027,857;

FIG. 4 is a fragmentary view of a valve according to the present invention, the valve being unpressurized;

FIG. 5 is face view of the valve bonnet showing the valve ports.

Figure 2:
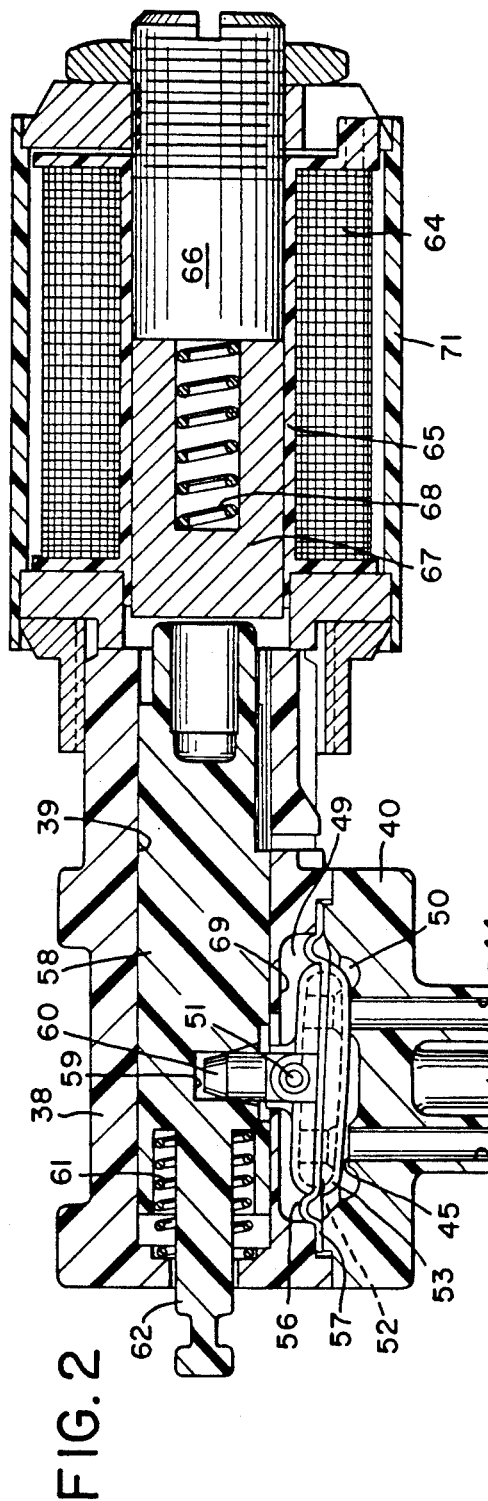
FIG. 2 is a longitudinal cross-sectional view through a valve according to the present invention, in pressurized condition, the valve member being in one of its extreme positions.

FIG. 1 shows the valve of U.S. Pat. No. 5,027,857, and in fact is similar to FIG. 1 appearing in that patent. However, the valve is shown unpressurized in FIG. 1 of the patent, whereas in FIG. 1 of the present drawings the valve is shown with fluid pressure applied to it.

The prior art valve of FIG. 1 includes a valve body 10 having a cylindrical bore 11. Secured to the valve body, such as by screws 12, is a bonnet 13 formed with a fluid pressure inlet port 14 and two outlet ports 15 and 16.

Body 10 and bonnet 13 between them define a chamber 19 with which ports 14–16 communicate. Accommodated within chamber 19 is a rocker valve member 20. Rocker valve member comprises a core 21 of rigid material encapsulated within a resilient, rubbery material 22. Valve member 20 is pivoted on an axle 23, so that it rocks between one extreme position, shown in FIG. 1, wherein it closes outlet port 16 while leaving outlet port 15 open, and another extreme position in which it closes outlet port 15 and opens outlet port 16.

The operator for the valve includes a piston 26 slidable longitudinally within cylinder 11, and the armature 27 of an electric solenoid. A stem 24 projects from valve member 20 into an enlarged bore 25 in piston 26. The cooperation of stem 24 and bore 25 converts longitudinal movement of piston 26 into rocking movement of valve member 20. A compression spring 28 within cylinder 11 constantly urges piston 26 toward the right in FIG. 1, and it is under the influence of spring 28 that the operator causes valve member 20 to close port 16 and open port 15, as shown. When the solenoid is energized, armature 27 moves toward the left, pulling piston 26 with it, against the force of spring 28. This movement of piston 26 is transmitted via stem 24 to valve member 20, causing the valve member to rock about axle 23 so as to close outlet port 15 and open port 16.

A diaphragm 31 completely surrounds valve member 20, and extends radially from the valve member to the interface between body 10 and bonnet 13. The entire peripheral margin 32 of the diaphragm is tightly squeezed between the body and bonnet. This arrangement serves to hold the diaphragm in place and also serves as a fluid seal between the body 10 and bonnet 13. It will be appreciated that diaphragm 31 serves to isolate ports 14–16 from cylinder 11, containing the operator 26, 27, so that the fluid being handled by the valve does not reach cylinder 11 or the parts of the valve operator.

When the valve is in the condition shown in FIG. 1, i.e., the solenoid is deenergized, and pressurized fluid is applied to inlet port 14, the portion of chamber 19 beneath valve member 20 and diaphragm 31 is filled with pressurized fluid, whereas the portion of chamber 19 above valve member 20 and diaphragm 31 is at atmospheric pressure. The fluid pressure causes diaphragm 31 to swell in an upward direction, and the portion of diaphragm 31 closer to open outlet port 15 engages the wall 33 of chamber 19. On the other hand, the portion of diaphragm 31 closer to closed outlet port 16 does not engage chamber wall 33. The reason that only a portion of the diaphragm engages wall 33 is due to the tilted orientation of valve member 20 which brings the portion of diaphragm 31 closer to the open outlet port nearer to chamber wall 33. Because the portion of diaphragm 31 closer to open port 15 is supported by chamber wall 33, there is an unexpected tendency for the valve member to lift away from closed valve port 16, causing the valve to leak.

It is believed that the reason for this disadvantageous effect may be explained as follows. The portion of the diaphragm closer to open outlet port 15 is being supported by both chamber wall 33 and valve member 20. However, the portion of diaphragm 31 closer to closed outlet port 16 is supported only by valve member 20, and not by wall 33. As a result, there is more fluid pressure force on the portion of the valve member closer to the closed outlet port than on the portion of the valve member closer to the open outlet port, and this unbalance of force tends to push valve member 20 away from closed port 16.

Another way of analyzing the problem is that when diaphragm 31 is pressurized and swells or bulges so that the portion closer to open port 15 is pushed against chamber wall 33, the wall applies a reactive force to the diaphragm in that region. No similar reactive force is applied to the portion of diaphragm 31 closer to the closed port 16. Hence, there is an unbalance of forces on the diaphragm, the force on the side closer to closed port 16, tending to open that port, being greater than the resultant of the forces on the diaphragm portion closer to the open port 15.

Because of the tendency of the rocker valve member 20 to lift off the closed port, leading to leakage, spring 28 and the solenoid pull force must be made relatively strong so as to minimize the leakage. The more powerful the solenoid pull force required, the more power the valve uses. Moreover, the higher spring and solenoid forces cause the resilient material 22 to be pressed against the seats of the outlet ports 15 and 16 with higher force, thereby reducing the useful lift of the valve.

Figure 3:
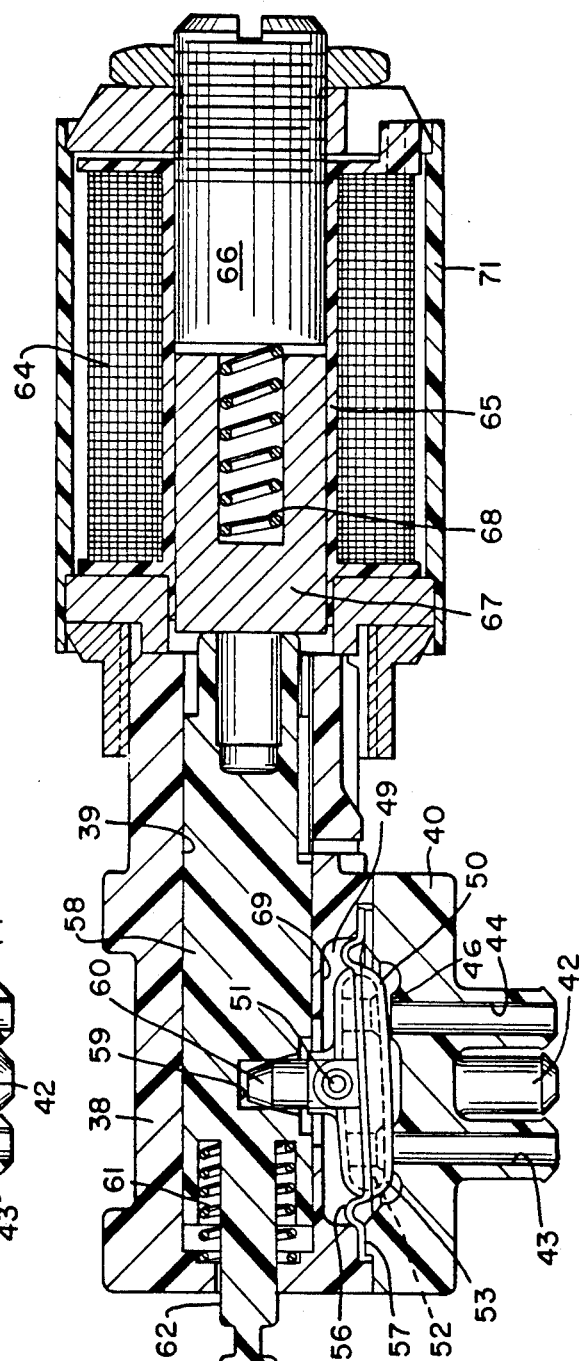
FIG. 3 is a view similar to FIG. 2, the valve member being in the other of its extreme positions.

The valve of the present invention, shown in FIGS. 2 and 3, overcomes the problems described above which are present in the prior art valve. The present valve is similar to the prior art valve, and includes a valve body 38 formed with an internal cylinder 39. A bonnet 40 is secured to the valve body by four bolts (not shown), which pass through four holes 41 (FIG. 5) in the bonnet and are threaded into tapped holes in the valve body.

Bonnet 40 is formed with a pressurized fluid inlet port 42 and two outlet ports 43 and 44 (FIGS. 2-5). The inner end of port 43 is surrounded by a valve seat 45, and the inner end of outlet port 44 is surrounded by a valve seat 46.

All three ports open into a valve chamber 49 defined between valve body 38 and bonnet 40. Accommodated within chamber 49 is a rocker valve member 50 pivotally mounted for rocking movement on an axle 51 extending perpendicular to the length of cylinder 39. Rocker valve member 50 includes a core 52 of rigid material encapsulated within a resilient, rubbery material 53.

A diaphragm 56 of limp, flexible, and rubbery material surrounds valve member 50 and extends radially between the valve member and the valve body. Preferably, the diaphragm is integrally formed with the encapsulation 53 of the valve member. The radially outward margin 57 of diaphragm 56 is squeezed tightly between valve body 38 and bonnet 40. To insure a tight grip on the diaphragm margin, a continuous narrow ridge 55 (FIG. 5) presented by the bonnet surrounds the ports and projects toward the valve body. In this way, the margin of the diaphragm is held in place, and also serves as a seal between the valve body and bonnet.

The operator for operating the valve includes a piston 58 slidable longitudinally within the cylinder 39 formed in valve body 38. Piston 58 is formed with a crosswise bore 59 which accommodates a rigid stem 60 projecting from core 52 of valve member 50. A compression spring 61 within cylinder 39, surrounding a pin 62 projecting from piston 58, constantly urges piston 58 toward the right, in FIG. 2, which movement is transmitted by means of bore 59 and stem 60 to valve member 50, so as to rock the valve member in a clockwise direction and cause it to engage valve seat 46 and thereby close outlet port 44. The tilted orientation of valve member 50 causes the valve member to be spaced from valve seat 45 so as to open outlet port 43.

Mounted on the end of valve body 38, opposite the end at which spring 61 is located, is a cylindrical housing 71 containing a solenoid coil 64 within which a core tube 65 extends axially. Fixed within the end of tube 65 remote from piston 58 is a stationary armature 66. Slidable within tube 65, toward and away from stationary armature 66 is a moveable armature 67. A compression spring 68 is accommodated within an axial bore in moveable armature 67, one end of the spring seating against stationary armature 66.

When solenoid 64 is deenergized, as shown in FIG. 3, spring 68, which is stronger than spring 61, urges moveable armature 67 and piston 58 toward the left, rocking valve member 50 in a counterclockwise direction about axle 51. In this way, valve member 50 is brought into engagement with valve seat 45, and brought out of engagement with valve seat 46, so as to close outlet port 43 and open outlet port 44. When solenoid 64 is energized, moveable armature 67 is drawn against stationary armature 66, thereby compressing spring 68, and permitting spring 61 to move piston 58 toward the right (FIG. 2) whereby valve member 50 is rocked so as to engage valve seat 46 and move away from valve seat 45. In this way, outlet port 43 is opened and outlet port 44 is closed.

When the valve is unpressurized, diaphragm 56 is in its uninflated condition, shown in FIG. 4. When pressurized fluid is applied to inlet port 42, pressure is applied to the side of valve member 50 and diaphragm 56 facing the ports, i.e., the lower side in FIGS. 2 and 3. As a consequence of the fluid pressure, diaphragm 56 swells or bulges toward the wall 69 of valve chamber 49, i.e., the wall opposite the wall of the chamber into which ports 42-44 open. A critical difference between the present invention and the prior art may be seen by comparing FIGS. 2 and 3 with FIG. 1. It will be seen that the swollen or inflated diaphragm 56 of the present invention does not contact wall 69, in the way that diaphragm 31 of the prior art contacts wall 33. In fact, diaphragm 56 remains out of engagement with wall 69 throughout all operating pressures of the valve.

Because diaphragm 56 never engages chamber wall 69, the unbalanced conditions experienced by the valve member 20 of the prior art valve never occur in the valve of the present invention. As a result, the tendency in the prior art valve for the valve member 20 to lift away from the port which is closed, so as to produce leakage, does not occur in the present valve. Therefore, for handling comparable fluid pressures, less force need be applied between the valve member and valve seats, so as to close the ports, and hence lighter springs and a less powerful solenoid can be used. A less powerful solenoid, of course, uses less power. Moreover, because a lighter spring and a less powerful solenoid are used, valve member 50 is not pressed against valve seats 45 and 46 with such high force as is present in the prior art valve, and hence the life of the valve member is extended.

The valve described above is of the three-way type. However, the invention is applicable to a two-way valve as well. The valve described above could be converted to a two-way valve simply by permanently closing off one of the outlet ports 43 and 44. Moreover, although port 42 has been referred to as the inlet port, and ports 43 and 44 as outlet ports, port 42 could be an outlet port, and either or both of ports 43 and 44 could be inlet ports.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed:

1. A valve comprising:
    a valve body having a chamber,
    a plurality of ports in the valve body communicating with the chamber, at least one of the ports being adapted for connection to a source of fluid under pressure,
    a rocker valve member within the chamber, the rocker valve member being pivotable to close and open at least one of the ports,
    a diaphragm within the chamber extending between the periphery of the rocker valve member and the valve body, the margin of the diaphragm being secured in the valve body, and all the ports facing one side of the diaphragm,
    an axle pivotally mounting the rocker valve member, the axle being located on the side of the diaphragm opposite the side facing the ports,
    operator means for pivoting the rocker valve member, the operator means engaging the rocker valve member on the side of the diaphragm opposite the side facing the ports, whereby the diaphragm serves to isolate the ports from the operator means, and
    the valve body being devoid of means for supporting the portion of the diaphragm between the periphery of the rocker valve member and the valve body when that portion of the diaphragm swells in a direction away from the plurality of ports in response to the source of fluid pressure applied to at least one of the ports, at all operating pressures of the valve, to prevent leakage between the rocker valve member and the closed port.

2. A valve as defined in claim 1 wherein the chamber is defined in part by a wall facing the side of the diaphragm opposite the side of the diaphragm facing the ports, the wall being spaced far enough from the diaphragm so that when the portion of the chamber between the diaphragm and the ports is pressurized, causing the diaphragm to swell in the direction of the wall, the wall is not engaged by the diaphragm.

3. A valve as defined in claim 1 including an opening into the chamber through which the operator means communicates with the rocker valve member, the opening facing the side of the diaphragm opposite the side of the diaphragm facing the ports.

4. A valve as defined in claim 1 including a cylinder within the valve body, and wherein the operator means includes a piston slidable longitudinally within the cylinder, an opening in the valve body between the chamber and the cylinder, and means extending through the opening and responsive to back-and-forth longitudinal movement of the piston for pivoting the rocker valve member.

5. A valve as defined in claim 1 wherein the rocker valve member comprises a core of rigid material encapsulated within an outer layer of resilient material, the diaphragm being integral with and an annular extension of the resilient encapsulating material.

6. A valve as defined in claim 1 wherein the valve body has an inlet port and two outlet ports, and the rocker valve member is pivotable between one extreme position, in which it closes one of the outlet ports and opens the other, and another extreme position, in which it opens said one outlet port and closes said other outlet port.

* * * * *